United States Patent [19]

Yamashiro et al.

[11] Patent Number: 5,061,169
[45] Date of Patent: Oct. 29, 1991

[54] MECHANISM FOR WORK PICKUP IN AN INJECTION MOLDING APPARATUS

[75] Inventors: Shinji Yamashiro; Takanori Hara, both of Hiroshima, Japan

[73] Assignee: Mazda Motor Corporation, Hiroshima, Japan

[21] Appl. No.: 381,773

[22] Filed: Jul. 18, 1989

[30] Foreign Application Priority Data

Jul. 26, 1988 [JP] Japan .................................. 63-184602
Jul. 26, 1988 [JP] Japan .................................. 63-184603

[51] Int. Cl.$^5$ .............................................. B29C 45/42
[52] U.S. Cl. .................................. 425/190; 264/297.2; 264/328.7; 264/328.8; 264/328.11; 425/444; 425/556; 425/574; 425/575
[58] Field of Search ............... 264/297.2, 328.7, 328.8, 264/328.11, 328.14; 425/185, 190, 436 R, 444, 547, 553, 554, 556, 574, 575, 345, 186, 195, 183

[56] References Cited

U.S. PATENT DOCUMENTS

| | | | |
|---|---|---|---|
| 3,945,230 | 3/1976 | Tomioka et al. | 72/30 |
| 4,462,783 | 7/1984 | Hehl | 425/183 |
| 4,472,127 | 9/1984 | Cyriax et al. | 425/183 |
| 4,518,338 | 5/1985 | Hehl | 425/575 |
| 4,544,340 | 10/1985 | Hehl | 425/183 |
| 4,601,422 | 7/1986 | Dumargue et al. | 228/44.3 |
| 4,698,007 | 10/1987 | Hehl | 425/190 |
| 4,737,095 | 4/1988 | Hehl | 425/190 |
| 4,758,147 | 7/1988 | Inaba | 425/186 |

FOREIGN PATENT DOCUMENTS

| | | |
|---|---|---|
| 61-9128 | 3/1986 | Japan . |
| 63-82532 | 5/1988 | Japan . |
| 63-116823 | 5/1988 | Japan . |
| 63-116824 | 5/1988 | Japan . |
| 63-116825 | 5/1988 | Japan . |
| 63-116826 | 5/1988 | Japan . |
| 63-116827 | 5/1988 | Japan . |
| 63-116828 | 5/1988 | Japan . |
| 63-84327 | 6/1988 | Japan . |
| 63-159026 | 7/1988 | Japan . |
| 63-267530 | 11/1988 | Japan . |

Primary Examiner—Timothy Heitbrink
Attorney, Agent, or Firm—Price, Heneveld, Cooper, DeWitt & Litton

[57] ABSTRACT

An injection molding apparatus includes first and second injection molding units, which are juxtaposed, for independently executing injection molding operations, and a placing station which is disposed between the first and second injection molding units, and to which a used injection-molding metal mold detached from each of the first and second injection molding units is conveyed to be commonly placed thereon.

8 Claims, 12 Drawing Sheets

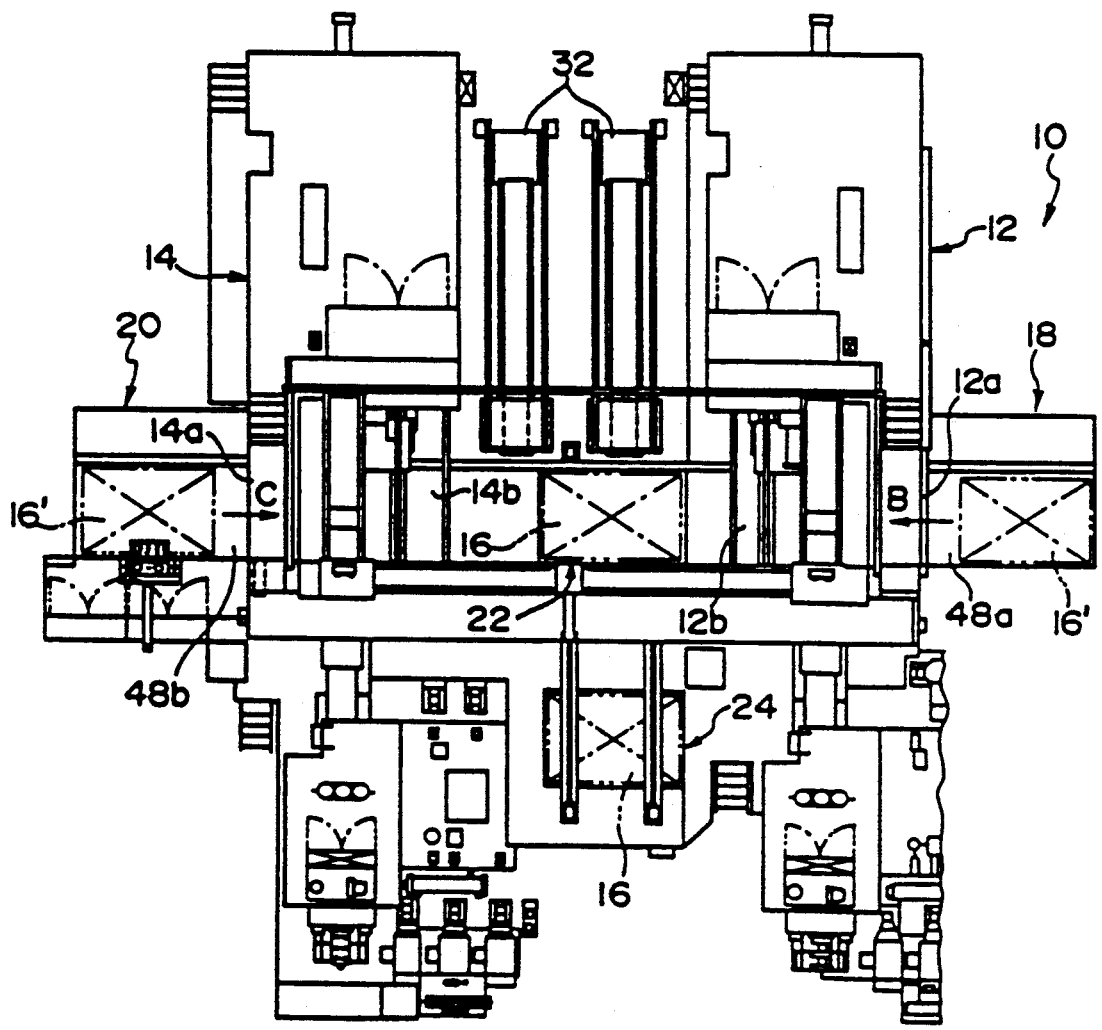
F I G. 1

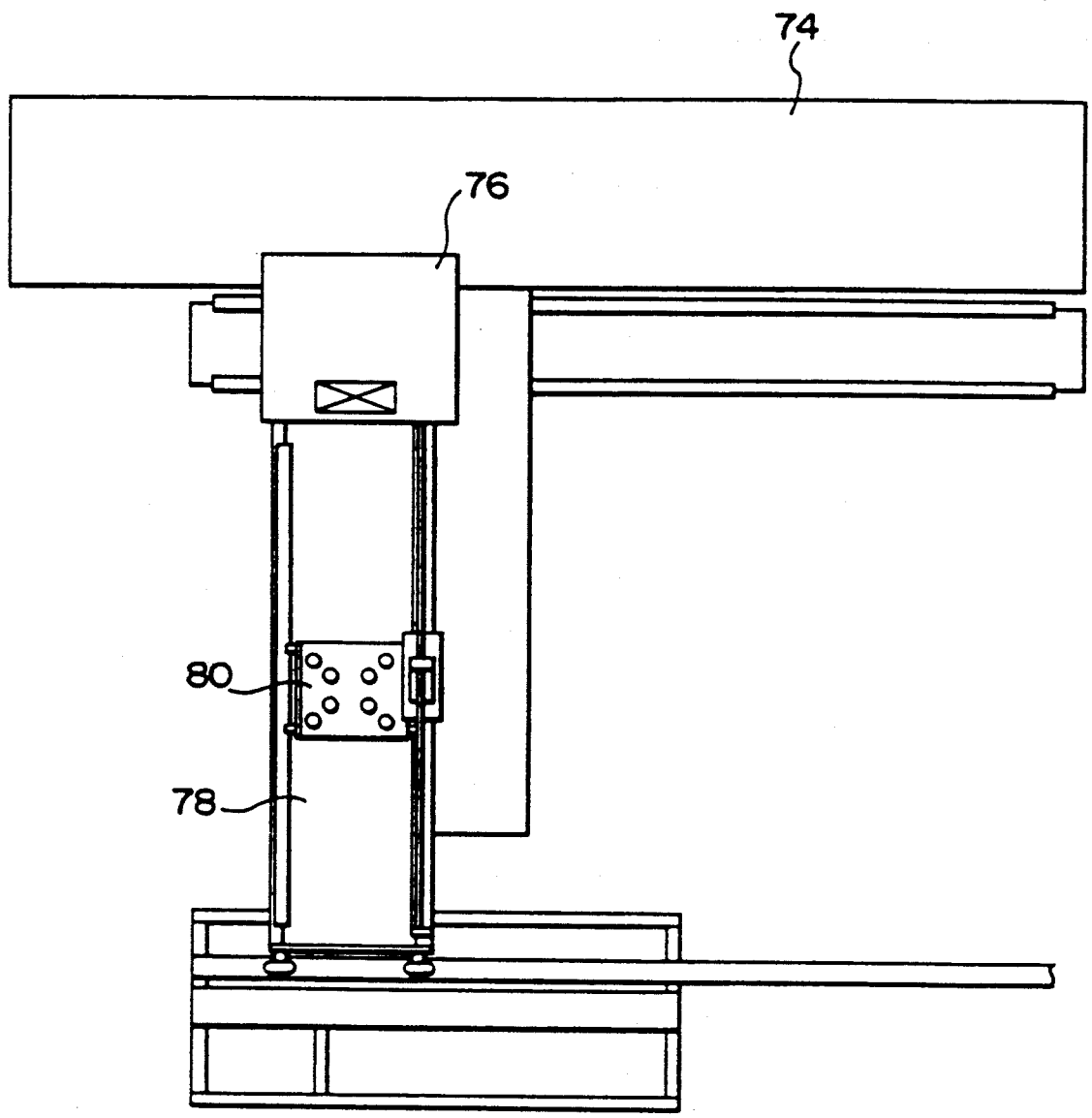
F I G. 7

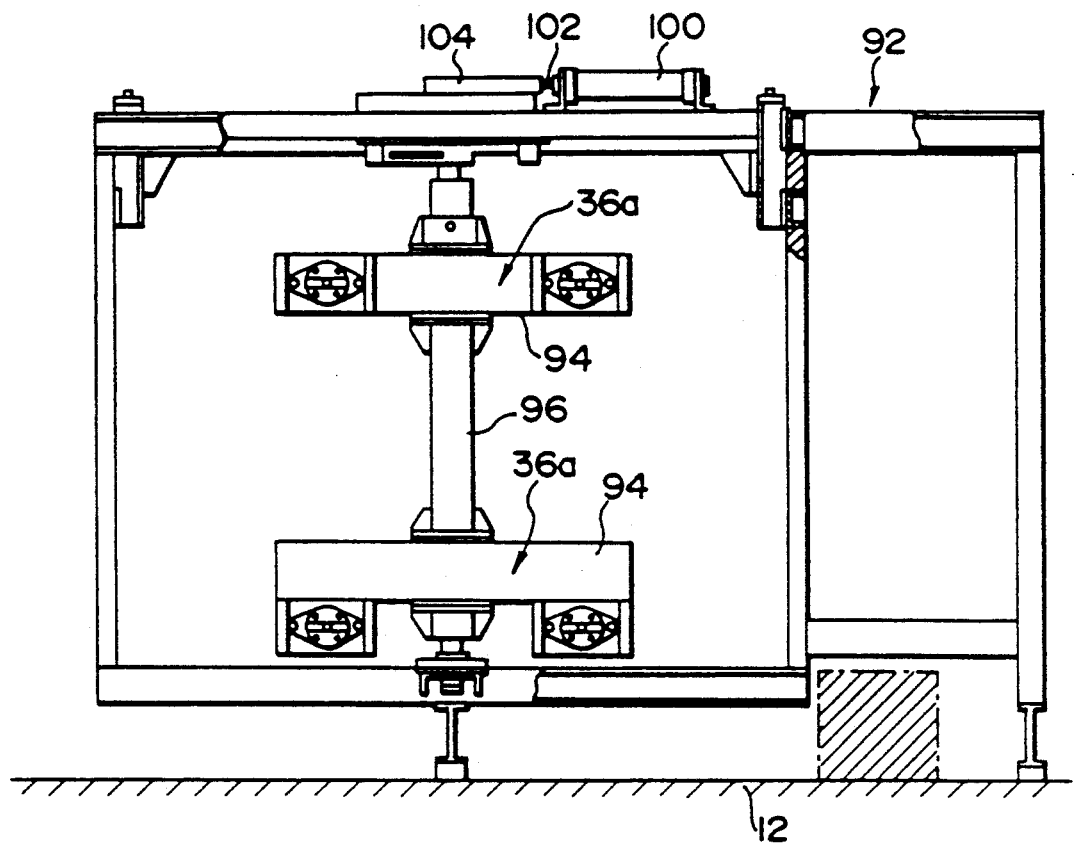
F I G. 12
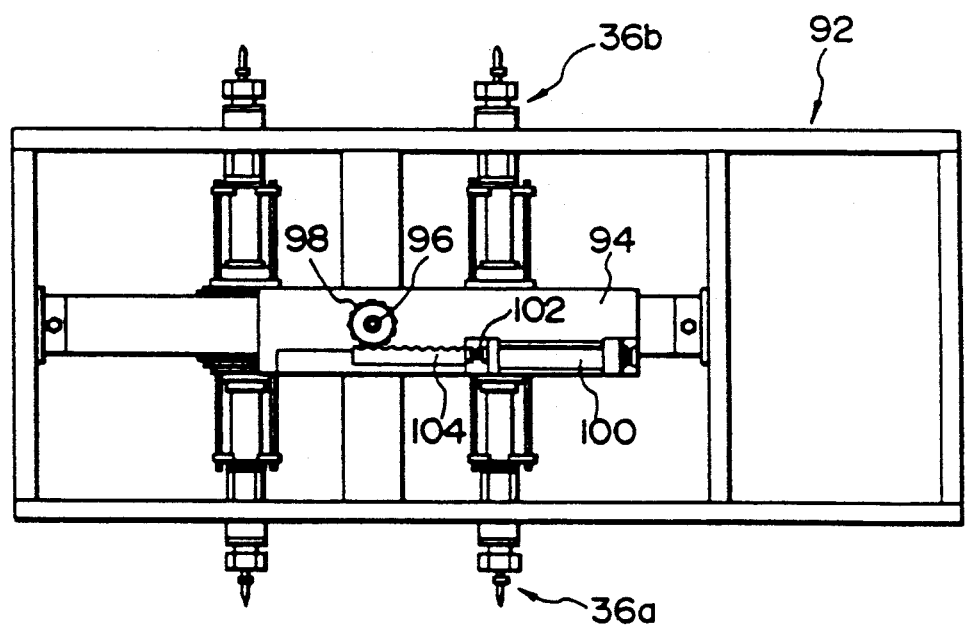
F I G. 13

5,061,169

MECHANISM FOR WORK PICKUP IN AN INJECTION MOLDING APPARATUS

BACKGROUND OF THE INVENTION

The present invention relates to an injection molding apparatus comprising two injection molding units and, more particularly, to an injection molding apparatus comprising an exchanger for automatically exchanging a chuck mechanism of a work pickup device arranged on its top portion.

Conventionally, an injection molding apparatus which comprises two injection molding units and operates these units independently to efficiently mold works is known, and is commercially available. In particular, in order to control and optimally operate two injection molding units, an automatic operation control system is known, as described in, e.g., Japanese Patent Publication No. 61-9128. When such an automatic operation control system is adopted, the two injection molding units can optimally and efficiently injection-mold works, and production efficiency can be improved.

However, even if the operations of the two injection molding units are optimally controlled, the two injection molding units are independently installed in a conventional factory layout, and each unit has an exclusive mold exchanging mechanism. For this reason, a problem of inefficient use of an installation space of a factory is pointed out.

The number of types of works which can be molded by a single injection molding apparatus is very large since metal molds can be exchanged. Thus, many chuck mechanisms for picking up works are necessary in correspondence in number with the types of metal molds in accordance with the shapes of the works. When metal molds are exchanged, a work pickup device of the chuck mechanism must be exchanged. However, the chuck mechanism is manually exchanged in the present state, thus posing a problem of low work efficiency.

SUMMARY OF THE INVENTION

The present invention has been made in consideration of the above situation, and has as its object to provide an injection molding apparatus which can effectively utilize an installation space in a factory.

It is another object of the present invention to provide an injection molding apparatus which can efficiently operate two injection molding units.

It is still another object of the present invention to provide an injection molding apparatus which can improve work efficiency using a common metal mold exchanging mechanism.

To solve the above problems and to attain the above objects, an injection molding apparatus according to the present invention comprises first and second injection molding units which are juxtaposed and independently execute injection molding operations, and a placing station which is disposed between the first and second injection molding units and to which used injection-molding metal molds detached from the injection molding units are conveyed to be commonly placed thereon.

In the injection molding apparatus with the above arrangement, the two injection molding units are juxtaposed, and the placing station to which injection-molding metal molds detached from the injection molding units are conveyed to be placed thereon is disposed between these units. In this manner, the placing station is commonly used for the two injection molding units, and a space necessary for one placing station can be saved. Thus, a space in a factory can be effectively utilized.

It is still another object of the present invention to provide an injection molding apparatus which comprises a work pickup device exchanger capable of automatically exchanging chuck mechanisms.

It is still another object of the present invention to provide an injection molding apparatus which can efficiently exchange chuck mechanisms.

To attain these objects, an injection molding apparatus comprises work pickup means, arranged on a top portion of injection molding units, for picking up a work molded by a corresponding metal mold, the work pickup means including chuck means for chucking the work, a slide block for detachably holding the chuck means, and drive means for three-dimensionally moving the slide block, and exchanging means for automatically exchanging the chuck means of the work pickup means in accordance with a shape of the work.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1 and 2 are respectively a plan view and a right side view schematically showing an arrangement of an embodiment of an injection molding apparatus according to the present invention;

FIGS. 6, 7, and 8 are respectively a front view, a top view, and a left side view showing the overall arrangement of a pickup device;

FIGS. 12 and 13 are respectively a front view and a top view showing the overall arrangement of an exchanging mechanism;

DETAILED DESCRIPTION OF THE PREFERRED EMBODIMENT

Figure 2:
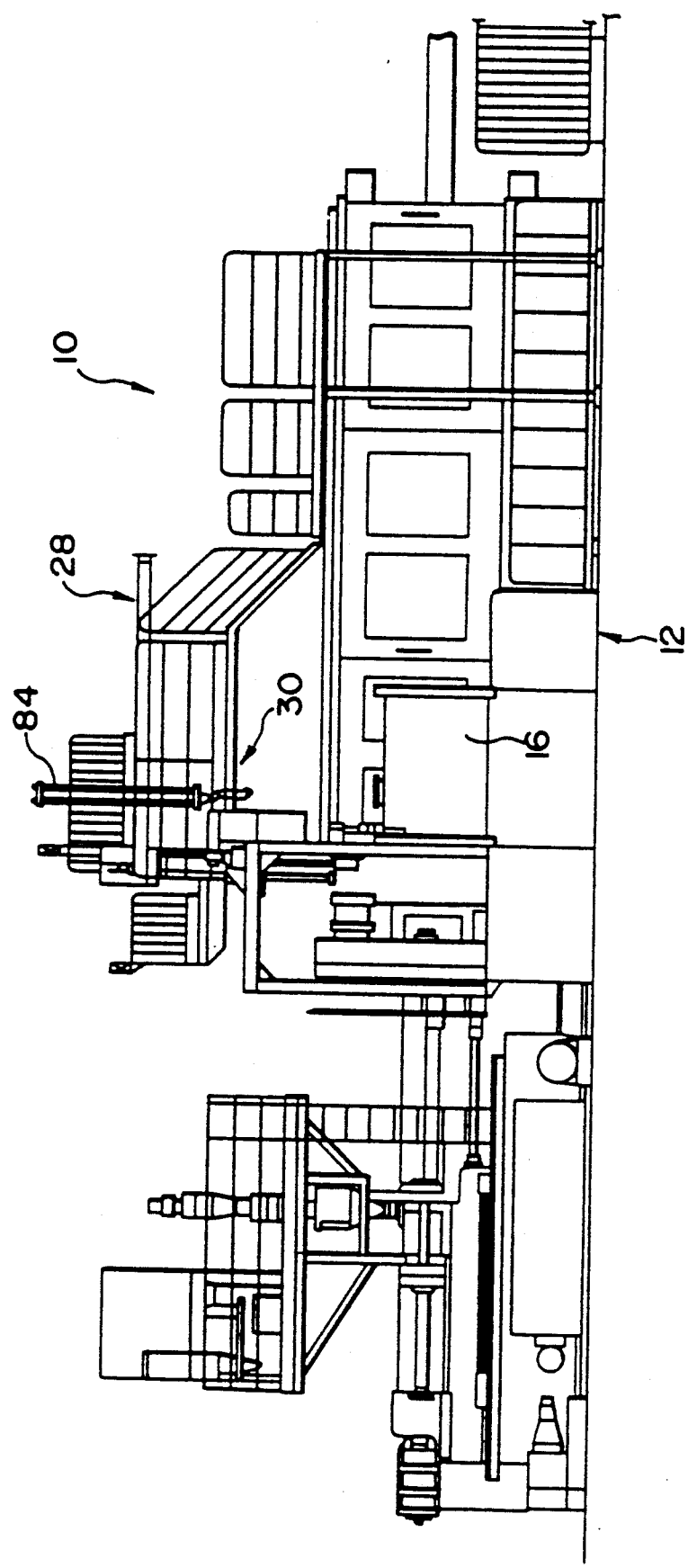

An arrangement of an embodiment of an injection molding apparatus according to the present invention will be described in detail below with reference to the accompanying drawings.

As shown in the plan view of FIG. 1, an injection molding apparatus 10 of this embodiment basically comprises: a pair of injection molding units 12 and 14 which are juxtaposed to be separated from each other; a pair of preheating stations 18 and 20, arranged outside the injection molding units 12 and 14, each for causing an injection-molding metal mold (to be simply referred to as a mold hereinafter) 16 to be used next to stand by in a preheated state; a mold placing station 22 which is disposed between the injection molding units 12 and 14 and on which used molds 16 detached from the injection molding units 12 and 14 to be exchanged with next molds 16' are moved and temporarily placed; a mold pickup station 24 arranged at a position separated downward from the mold placing station 22; an unmanned carrier 26 (shown in FIG. 5) which reciprocates between the mold placing station 22 and the mold pickup station 24 while placing the detached and exchanged mold 16 thereon; and a work pickup device 28 (shown in FIG. 2), disposed on each of the injection molding units 12 and 14, for picking up and conveying an injection-molded work W.

Each work pickup device 28 comprises a pickup mechanism 30 for picking up the work W molded by the mold 16 attached to the injection molding unit 12 or 14, as shown in FIG. 2 as the right side view of FIG. 1, and a conveyor 32 for receiving the picked-up work W from the pickup mechanism 30 and conveying it to an unloading mechanism (not shown), as shown in FIG. 1. As will be described in detail later, the work pickup device 28 comprises a chuck mechanism 34, attached to each corresponding mold 16 and formed to match with the shape of the injection-molded work W, for exclusively chucking the work W, and an exchanging mechanism 36 for exchanging the chuck mechanism 34 upon exchange of the mold 16, as shown in FIG. 8.

Figure 8:
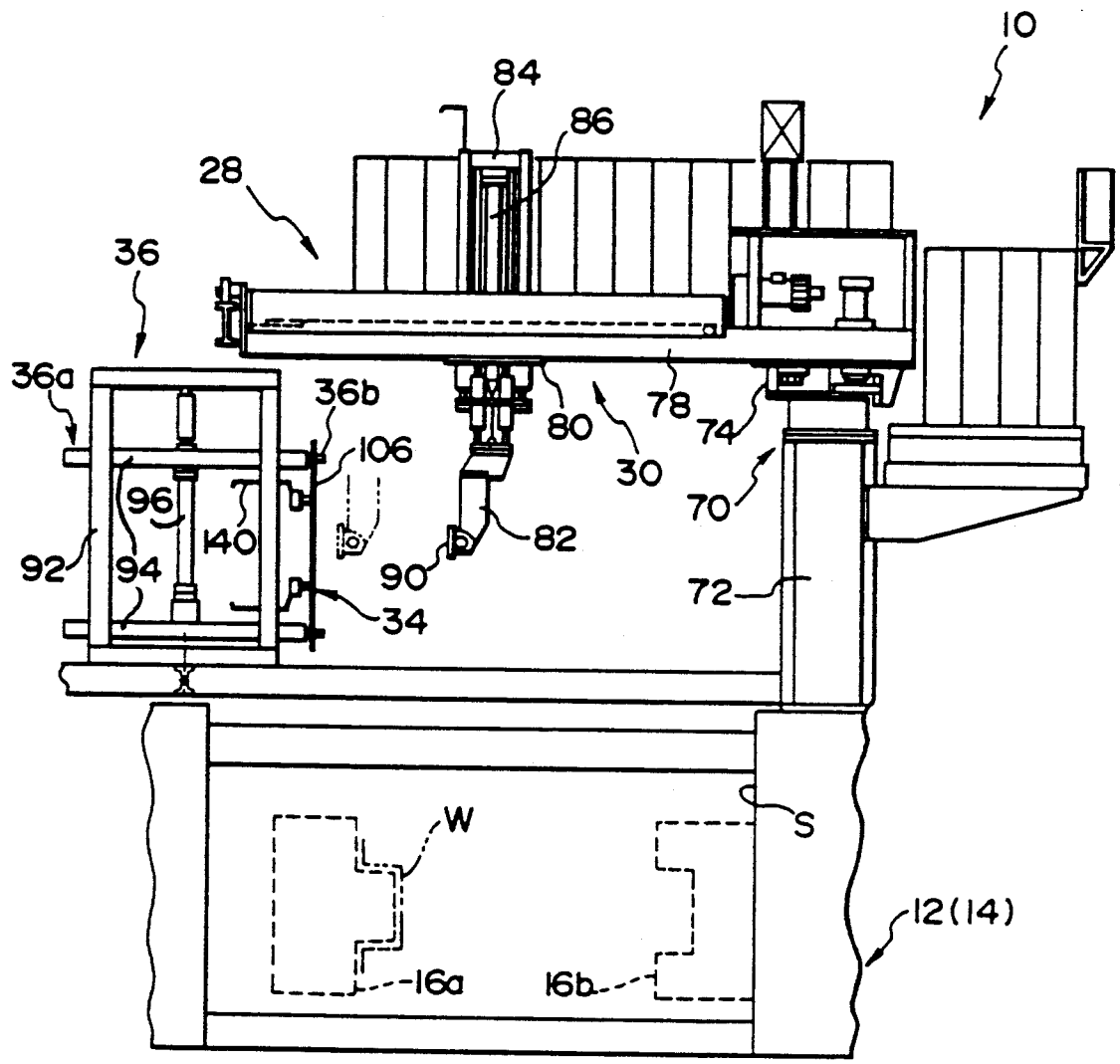

Each of the injection molding units 12 and 14 employs a known mold 16 constituted by a movable mold 16a and a stationary mold 16b, as shown in FIG. 8. Each of the injection molding units 12 and 14 has a known arrangement for molding a work W of a predetermined shape in accordance with the shape of a cavity defined between the movable and stationary molds by injecting a melted synthetic resin into the mold 16 at a predetermined high pressure. Therefore, a description of the injection molding units will be omitted as well as an arrangement of the mold 16.

Arrangements of other components of the injection molding apparatus 10 will be described below in turn.

The preheating stations 18 and 20 will be described below. Each of the preheating stations 18 and 20 causes a mold 16' to be used next in the corresponding injection molding unit 12 or 14 to stand by, and preheats the mold 16' in the standby state, so that the mold 16' can be immediately used when it is exchanged and attached to the corresponding injection molding unit 12 or 14. In other words, these preheating stations 18 and 20 are arranged to shorten a time required for a necessary exchange operation of the mold 16 and a rise time until an injection molding operation after the exchange operation as much as possible and to improve work efficiency.

Figure 3:
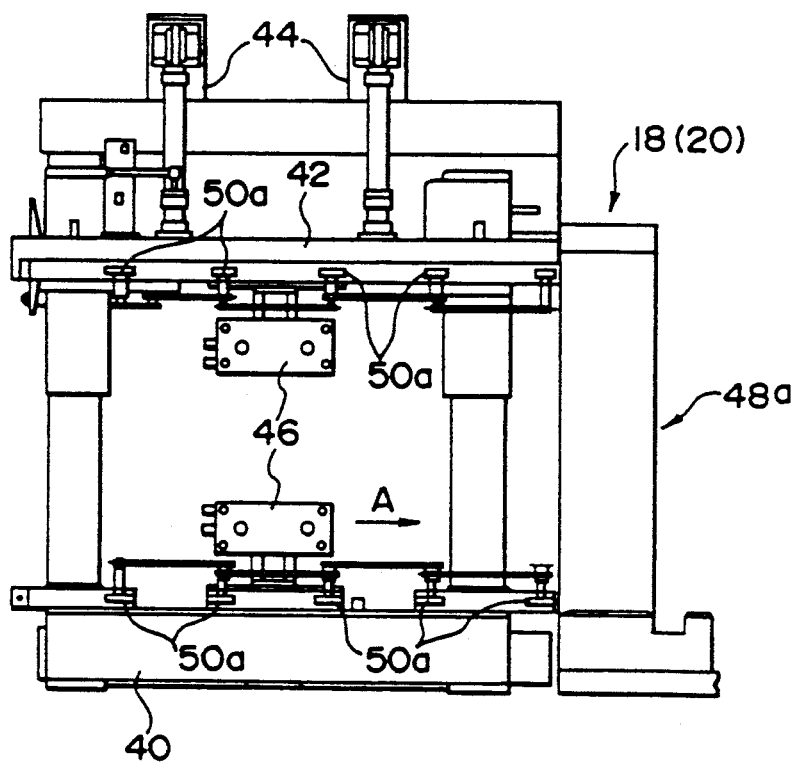
FIGS. 3 and 4 are respectively a top view and a front view showing an arrangement of a preheating station.
Figure 4:
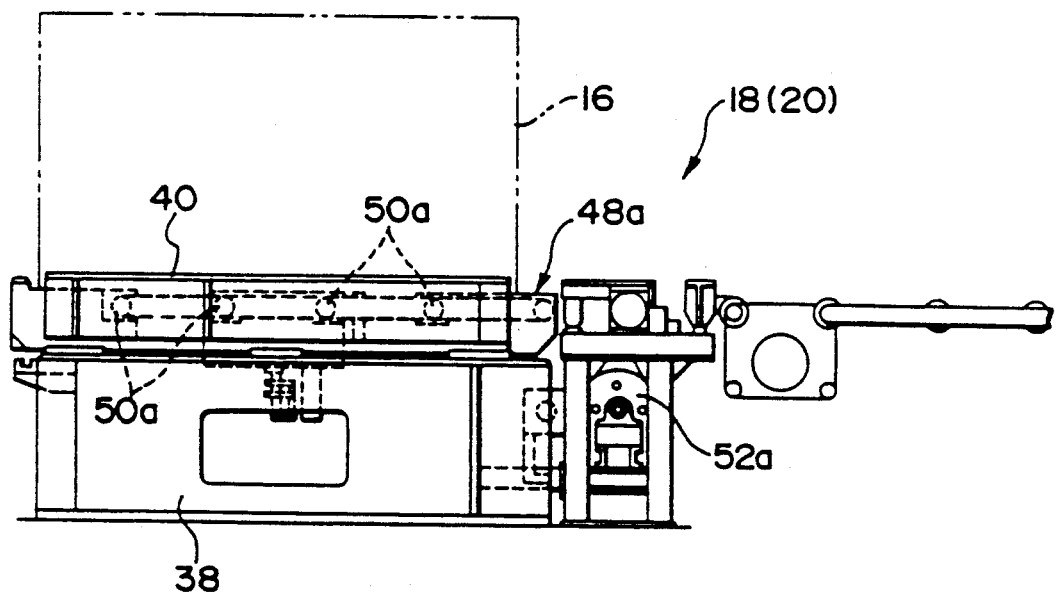

These preheating stations 18 and 20 are symmetrically arranged at the right and left positions. FIGS. 3 and 4 show the arrangement of the right preheating station 18 in FIG. 1, and a description of the left preheating station 20 in FIG. 1 will be omitted.

The preheating station 18 is located immediately outside a mold loading port 12a of the corresponding injection molding unit 12 to oppose this port 12a, as shown in FIG. 1. The mold placing station 22 is arranged to oppose mold loading ports 12a and 14a of the injection molding units 12 and 14 at its two sides. The mold loading port 12a and a mold loading port 14a oppose the mold unloading ports 12b and 14b. As shown in FIG. 1, the preheating stations 18 and 20 and the mold placing station 22 are arranged in line to sandwich the corresponding mold loading ports 12a and 14a and the corresponding mold unloading ports 12b and 14b therebetween.

The preheating station 18 comprises a base 38 on which the mold 16 conveyed by a lift convey mechanism such as a crane is placed, as shown in FIG. 4. A stationary positioning table 40 extending in a direction of an arrow A is fixed on one side of the top surface of the base 38. A movable positioning table 42 is arranged at a position on the base 38 separated from the stationary positioning table 40 by a predetermined interval to be desirably moved forward or backward with respect to the stationary positioning table 40. The predetermined interval is set to be large enough to place a mold 16 of a maximum size used in the injection molding apparatus 10. Hydraulic cylinder mechanisms 44 are connected to the movable positioning table 42 to be moved forward or backward.

With the above arrangement, the mold 16 temporarily placed on the base 38 is moved by the movable positioning table 42 upon operation of the hydraulic cylinder mechanisms 44 until a reference surface defined by one side surface of the mold 16 abuts against the stationary positioning table 40. In this manner, the mold 16 is precisely positioned on the preheating station 18.

Connection ports 46 respectively connected to entrance and exit ports of a heating circulating path (not shown) of the mold 16 are arranged below the mold 16 positioned in this manner. When the mold 16 is attached to the injection molding unit 12 or 14, a high-temperature medium is circulated through the heating circulating path to heat a portion around the cavity of the mold 16, so that a melted resin can be injected into the entire cavity. When the mold 16 is placed on the preheating station 18, the connection ports 46 are connected to the mold 16, and the high-temperature medium is circulated therethrough, so that the entire mold 16 can be preheated to a predetermined temperature.

The entrance and exit ports of the heating circulating path of the mold 16 are set at identical positions for all the molds 16 which are defined when each mold 16 is positioned as described above.

Figure 5:
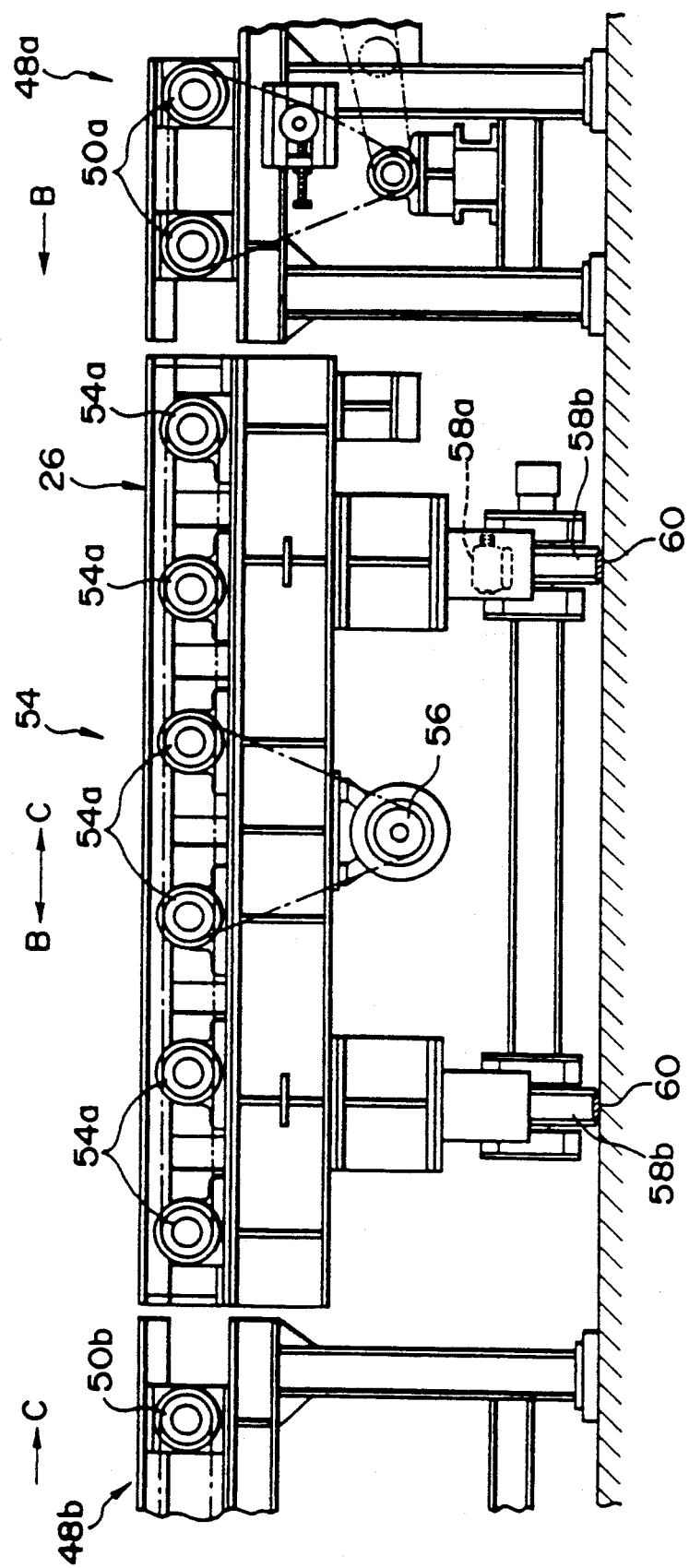
FIG. 5 is a front view showing an arrangement of an unmanned carrier.

A first conveyor 48a having a convey path for conveying the mold 16 from the preheating station 18 to the mold placing station 20 via the injection molding unit 12 is arranged between the preheating station 18 and the mold placing station 22. More specifically, the first conveyor 48a extends from a position below the preheating station 18 to a position adjacent to the unmanned carrier 26 stopped at the placing station 22, as shown in FIG. 5. The first conveyor 48a comprises a plurality of rotatable convey rollers 50a for conveying the mold 16 from the preheating station 18 toward the unmanned carrier 26 in a direction of an arrow B. These convey rollers 50a are rotated by a drive force of a drive motor 52a arranged below the convey path through a drive chain (its detail is not shown), as shown in FIG. 4.

A second conveyor 48b having a convey path for conveying the mold 16 from the preheating station 20 to the mold placing station 22 via the injection molding unit 14 is arranged between the left preheating station 20 in FIG. 1 and the mold placing station 22. More specifically, the second conveyor 48b extends from a position below the preheating station 20 to a position adjacent to the unmanned carrier 26 stopped at the placing station 22. The second conveyor 48b comprises a plurality of rotatable convey rollers 50b for conveying the mold 16 toward the unmanned carrier 26 in a direction of an arrow C opposite to the direction of the arrow B described above. These convey rollers 50b are connected to be rotated by a drive force of a drive motor (not shown) arranged below the convey path through a drive chain (its detail is not shown).

In other words, the convey paths of the first to third conveying members 48a, 48b, and 54 are arranged in line extending through the preheating stations 18 and 20 and the mold placing station 22 to match with each other.

With the above arrangement, when a mold is exchanged in order to change the type of work W to be molded in the injection molding unit 12 in use, a mold exchanging operation is performed as follows.

More specifically, for a new mold 16' to be exchanged, the connection ports 46 are detached to complete the preheating operation. A mold 16 to be exchanged (i.e., already used) is detached from the injection molding unit 12, and is placed on the first conveying member 48a. Thereafter, the drive motor 52a is started to convey the mold 16 detached from the injection molding unit 12 to the placing station 22, and the mold 16' preheated by the preheating station 18 is conveyed to the injection molding unit 12. The preheated new mold 16' is attached to the injection molding unit 12 to complete the mold exchanging operation.

A mold 16' to be used next is suspended by a crane from a stacker (not shown) and is conveyed to the preheating station 18, and the preheating operation is started for the new mold 16'. At the same time, a transfer operation of the detached and exchanged mold 16 to the mold pickup station 24 is started at the placing station 22, as will be described later.

In the placing station 22 described above, the unmanned carrier 26 which can be reciprocally moved between the station 22 and the mold pickup station 24 is arranged. The unmanned carrier 26 is provided with a conveyor 54 for conveying the mold 16, which has been conveyed from the right or left preheating station 18 or 20 to a position adjacent to the carrier 26, to a position on the carrier 26, at the standby position, as shown in FIG. 5. The conveyor 54 comprises loading rollers 54a at the same level as the rollers 50a and 50b described above.

The loading rollers 54a are rotated by another drive motor 56 arranged in the unmanned carrier 26. The drive motor 56 is a reversible motor. Therefore, even if the mold 16 is conveyed from either the preheating station 18 or 20, the mold 16 can be accurately loaded on the unmanned carrier 26 located at the placing station 22 by rotating the loading rollers 54a in the corresponding direction.

As described above, the placing station 22 is located at the center between the two injection molding units 12 and 14. With this arrangement, the placing station 22 can receive the exchanged molds 16 detached from the two injection molding units 12 and 14. As a result, in this embodiment, two placing stations need not be arranged. An installation space in a factory can be effectively utilized, and an automatic exchanging operation of molds can be efficiently carried out.

As described above, the mold 16 conveyed to the placing station 22 is temporarily transferred onto the unmanned carrier 26, and is then conveyed to the pickup station 24 arranged at a position separated from the placing station 22 in a direction perpendicular to the direction of the arrow A. This arrangement is adopted for the following reason. That is, since the work pickup devices 28 are arranged on the injection molding units 12 and 14 and a space above the placing station 22 is closed by these work pickup devices 28, it is impossible to directly suspend the mold 16 upward from the placing station 22 by a crane or the like.

The unmanned carrier 26 is of automatic traveling type comprising wheels 58b rotated by drive motors 58a as convey drive sources, as shown in FIG. 5. As shown in FIG. 1, a pair of rails 60 for defining a travel path between the placing station 22 and the pickup station 24 are laid on a foundation. These rails 60 extend from the placing station 22 as a starting point, i.e., in a direction perpendicular to the direction of the arrow A.

The mold 16 placed on the unmanned carrier 26 which travels from the placing station 22 to the pickup station 24 along the pair of rails 60 is stopped at the pickup station 24. The mold 16 is then suspended by a crane or the like (not shown), and is conveyed to a stacker (not shown) to be stacked to stand by therein.

The arrangement of the work pickup device 28 for picking up the work W in the injection molding unit 12 or 14 will be described in detail below with reference to FIG. 6 and the subsequent drawings.

The overall arrangement of the work pickup device 28 will now be described with reference to FIGS. 6 to 8.

The work pickup devices 28 are respectively arranged on the two injection molding units 12 and 14 and are symmetrically arranged at the right and left positions. Thus, only the work pickup device 28 arranged on the left injection molding unit 12 in FIG. 1 will be described below, and a description of the work pickup device 28 arranged on the injection molding unit 14 will be omitted.

Figure 6:
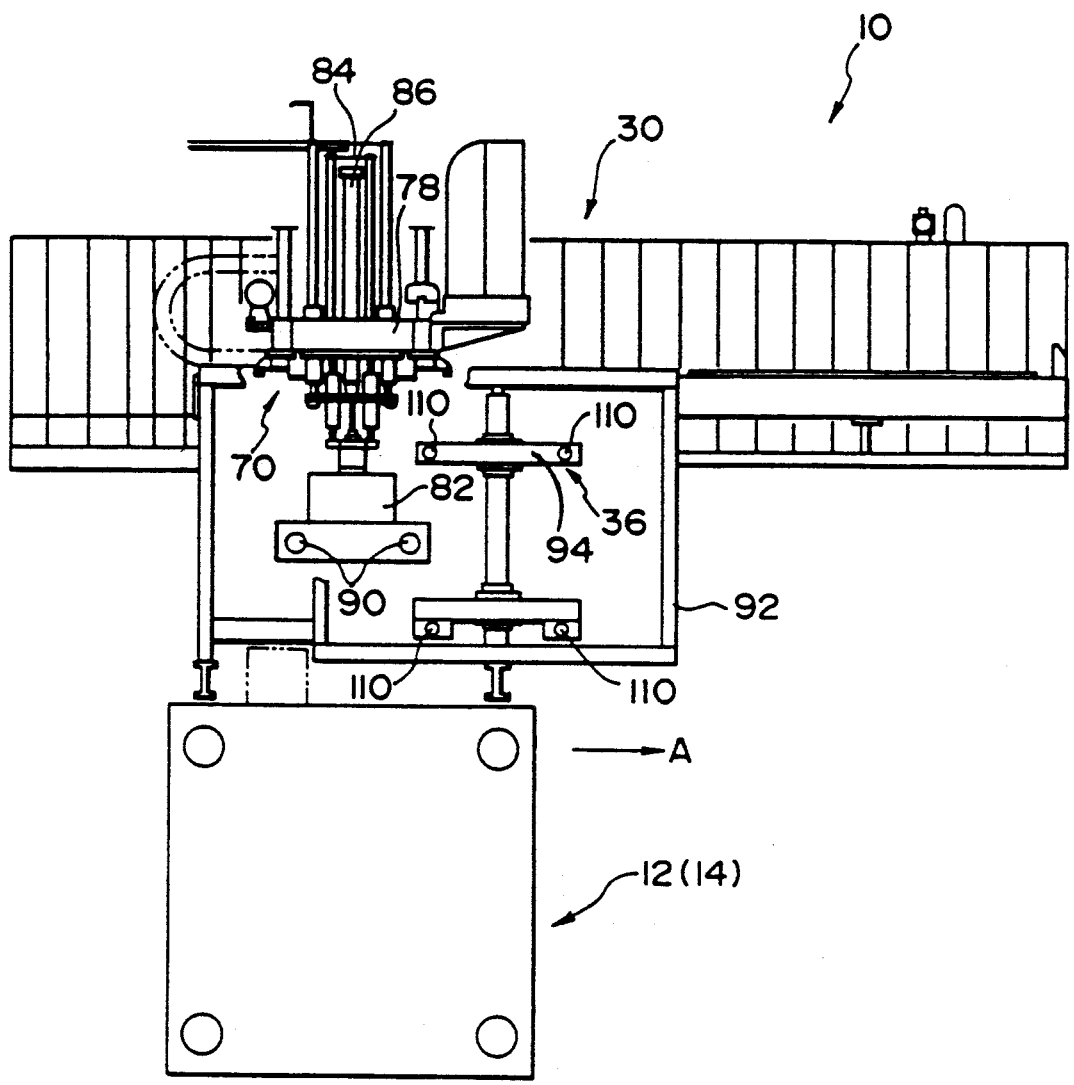

As shown in the front view of FIG. 6, the top view of FIG. 7, and the left side view of FIG. 8, the work pickup device 28 comprises a pickup mechanism 30 arranged on the upper surface of the corresponding injection molding unit 12. The pickup mechanism 30 is constituted by a three-dimensional slide drive mechanism 70 (to be described later), and the above-mentioned chuck mechanism 34 which is slidably moved in the back-and-forth, right-and-left, and up-and-down directions through the three-dimensional slide drive mechanism 70. A chuck replacing mechanism 36 for replacing the chuck mechanism 34 equipped in the pickup mechanism 30 in accordance with the mold 16 to be exchanged is arranged on the injection molding unit 12 to oppose the pickup mechanism 30.

The three-dimensional slide drive mechanism 70 comprises a support main body 72 fixed upright on the upper surface of the corresponding injection molding unit 12, as shown in FIG. 8, a right-and-left support arm 74 extending from the upper end of the support main body 72 in a direction perpendicular to the drawing surface of FIG. 8, i.e., in the right-and-left direction in FIGS. 6 and 7 (the same direction as the convey direction of the mold 16 indicated by the arrow A in FIG. 1), a right-and-left slide block 76 supported on the right-and-left support arm 74 to be slidable in the right-and-left direction, a back-and-forth support arm 78 extending from the right-and-left slide block 76 in the right-and-left direction in FIG. 8, i.e., in the back-and-forth direction in FIG. 7, a back-and-forth slide block 80 supported on the back-and-forth support arm 78 to be slidable in the back-and-forth direction, and an up-anddown slide block 82 supported on the back-and-forth slide block 80 to be slidable in the up-and-down direction in FIG. 6. The above-mentioned chuck mechanism 34 is detachably attached to the lower end of the up-and-down slide block 82 through a lock mechanism 90 (to be described later).

The right-and-left slide block 76 and the back-and-forth slide block 80 are respectively connected to hydraulic cylinder mechanisms (not shown), and are respectively slidably moved in the right-and-left and back-and-forth directions upon operation of these hydraulic cylinder mechanisms. On the other hand, the up-and-down slide block 82 is mounted on the lower end of a piston rod 86 which is reciprocated along the up-and-down direction of a hydraulic cylinder mechanism 84 which is fixed upright on the upper surface of the back-and-forth slide block 80.

As shown in FIG. 8, the mold 16 in the injection molding unit 12 is installed while its stationary mold is fixed to a mold mounting surface designated by reference symbol S. After a predetermined work W is injection-molded by the mold 16, the movable mold is separated from the stationary mold. In this case, the work W is released from the stationary mold upon separation of the movable mold while being attached to the movable mold, as indicated by an alternate long and short dashed line. In order to allow picking up of the work W which is released from the stationary mold and attached to the movable mold, the left-and-right, back-and-forth, and up-and-down slide blocks 76, 80, and 82 respectively have predetermined slide strokes.

Since the three-dimensional slide drive mechanism 70 has the arrangement as described above, when the work W is picked up from the mold 16 after the injection molding operation, the chuck mechanism 34 attached to the distal end of the up-and-down slide block 82 is inserted from the above between the separated stationary and movable molds. Thereafter, the up-and-down slide block 82 is slid toward the movable mold With this operation, the chuck mechanism 34 is engaged with and chucks the work W attached to the movable mold.

Upon completion of the chucking operation, a reject pin (not shown) in the movable mold projects and pushes away the work W attached to the movable mold. At the same time, the three-dimensional slide drive mechanism 70 is started to slide the chuck mechanism 34 to be separated from the movable mold. In this manner, the work W is separated from the movable mold while being chucked by the chuck mechanism 34. Thereafter, the slide drive mechanism 70 is further driven, and the chucked work W is conveyed to and discharged onto a base end portion of the conveyor 32 shown in FIG. 1. In this manner, a series of pickup operations of the work W are completed.

Figure 9:
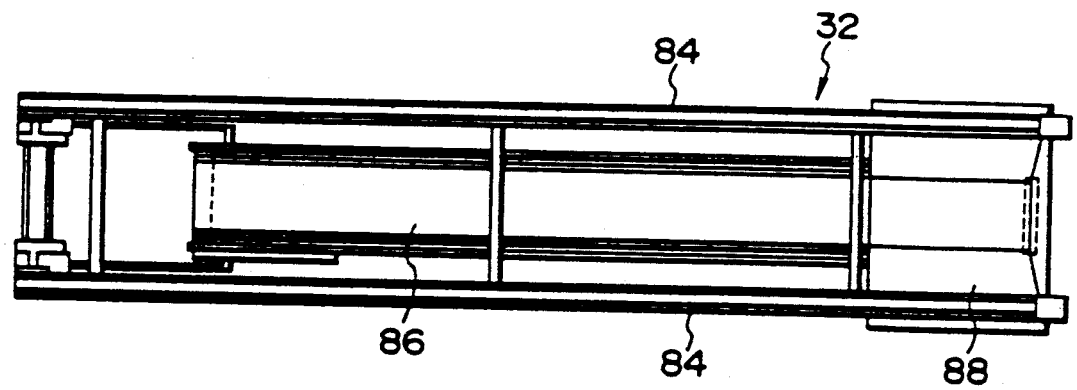
FIGS. 9, 10, and 11 are respectively a top view, a left side view, and a front view showing the overall arrangement of a conveyor.
Figure 10:
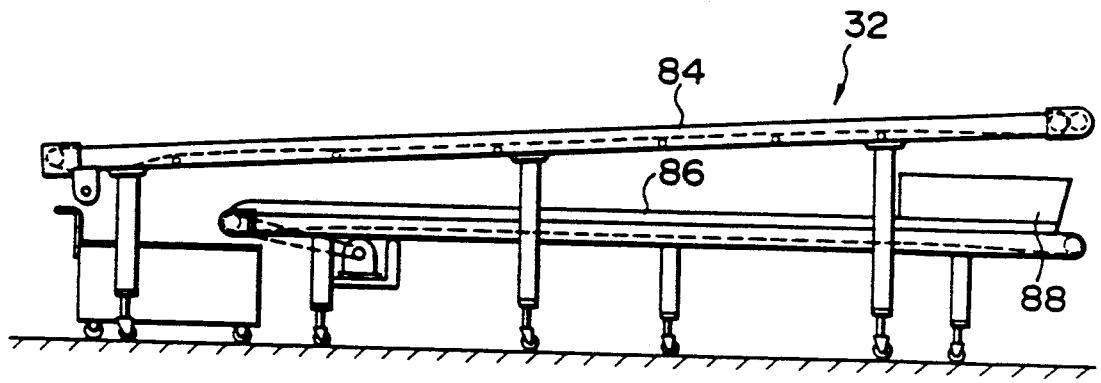
Figure 11:
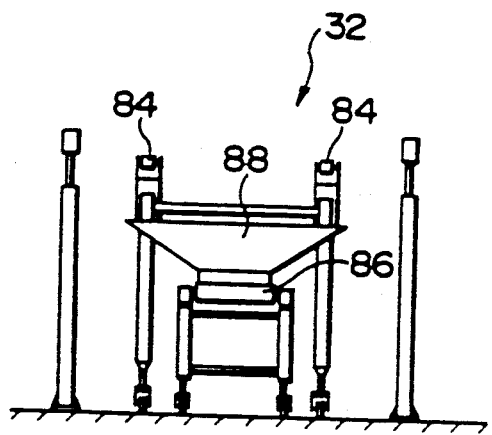

The arrangement of the conveyor 32 will be described below with reference to FIGS. 9 to 11. As shown in the top view of FIG. 9, the left side view of FIG. 10, and the front view of FIG. 11, the conveyor 32 comprises a pair of work conveyor belts 84 for placing the work W thereon and conveying it toward the leading end portion, and a deposit conveyor belt 86, disposed between the pair of work conveyor belts 84, for conveying a deposit such as a runner, spool, gate, or the like attached to the work W in a state separated from the work W.

Both the work conveyor belts 84 are inclined downward from the base end portion toward the leading end portion. The deposit conveyor belt 86 is substantially horizontally set at a level entirely lower than the work conveyor belts 84. A pan 88 for temporarily receiving a deposit separated from the work W is mounted on the base end portion of the deposit conveyor belt 86.

Although not shown, the chuck mechanism 34 has a cut mechanism for cutting a deposit integrally connected to the work W in a state wherein the work W is separated from the mold 16. When the deposit is conveyed to the conveyor 32 through the chuck mechanism 34 together with the work W, it is cut off by the cut mechanism while being placed on the base end portion of the conveyor 32, and is solely dropped on the pan 88.

Since a chuck position of the chuck mechanism 34 is changed in accordance with the type of work W to be injection-molded, i.e., the type of mold 16, the chuck mechanisms 34 having various shapes are accordingly prepared. In a drive state, a chuck mechanism 34 having a shape according to the mold 16 installed in the injection molding unit 12 is detachably attached to the up-and-down slide block 82 through the lock mechanism 90.

In order to allow efficient attachment of the corresponding chuck mechanism 34 to the up-and-down slide block 82 in accordance with the exchanging operation of the mold 16, as shown in FIG. 8, the replacing mechanism 36 is arranged at a position horizontally opposing the up-and-down slide block 82 at its upper position.

The arrangements of the replacing mechanism 36, the chuck mechanism 34, and the lock mechanism 90 will be described below in turn.

The replacing mechanism 36 comprises a first mounting station 36a to which a new chuck mechanism to be attached is attached, and a second mounting station 36b to which the chuck mechanism 34 which is detached from a state wherein it is fixed to the up-and-down slide block 82 through the lock mechanism 90 so as to be exchanged is recovered and attached.

As shown in the front view of FIG. 12 and the top view of FIG. 13, a rectangular-prism-like frame body 92 is fixed to the replacing mechanism 36 at a position above the injection molding unit 12 and opposing the three-dimensional slide drive mechanism 70 to sandwich the up-and-down slide block 82 therebetween. A rotary support member 94 is disposed in the frame body 92 to be rotatable about its central axis. The first and second mounting stations 36a and 36b are mounted on the rotary support member 94 to be separated at a 180° angular interval, i.e., at opposing positions about the central axis.

The upper end of a pivot shaft 96 of the rotary support member 94 projects upward from the frame body 92. A pinion gear 98 is coaxially fixed to the projecting end. An air cylinder 100 as a drive source is disposed on the upper surface of the frame body 92. A rack 104 meshed with the pinion gear 98 is mounted on a piston rod 102 of the air cylinder 100. The projection amount of the piston rod 102 is defined to rotate the pinion gear 98, i.e., the rotary support member 94 through 180° when compressed air is introduced into the air cylinder 100.

When no compressed air is introduced in the air cylinder 100 and the piston rod 102 is retracted, the second mounting station 36b is brought to a position opposing the up-and-down slide block 82. When compressed air is introduced into the air cylinder 100, the rotary support member 94 is rotated through 180°, and the first mounting station 36a opposes the up-and-down slide block 82.

The arrangements of the first and second mounting stations 36a and 36b will be described below with reference to FIG. 14. Since the first and second mounting stations 36a and 36b have the same arrangement, only the arrangement of the first mounting station 36a will be described below.

Figure 15:
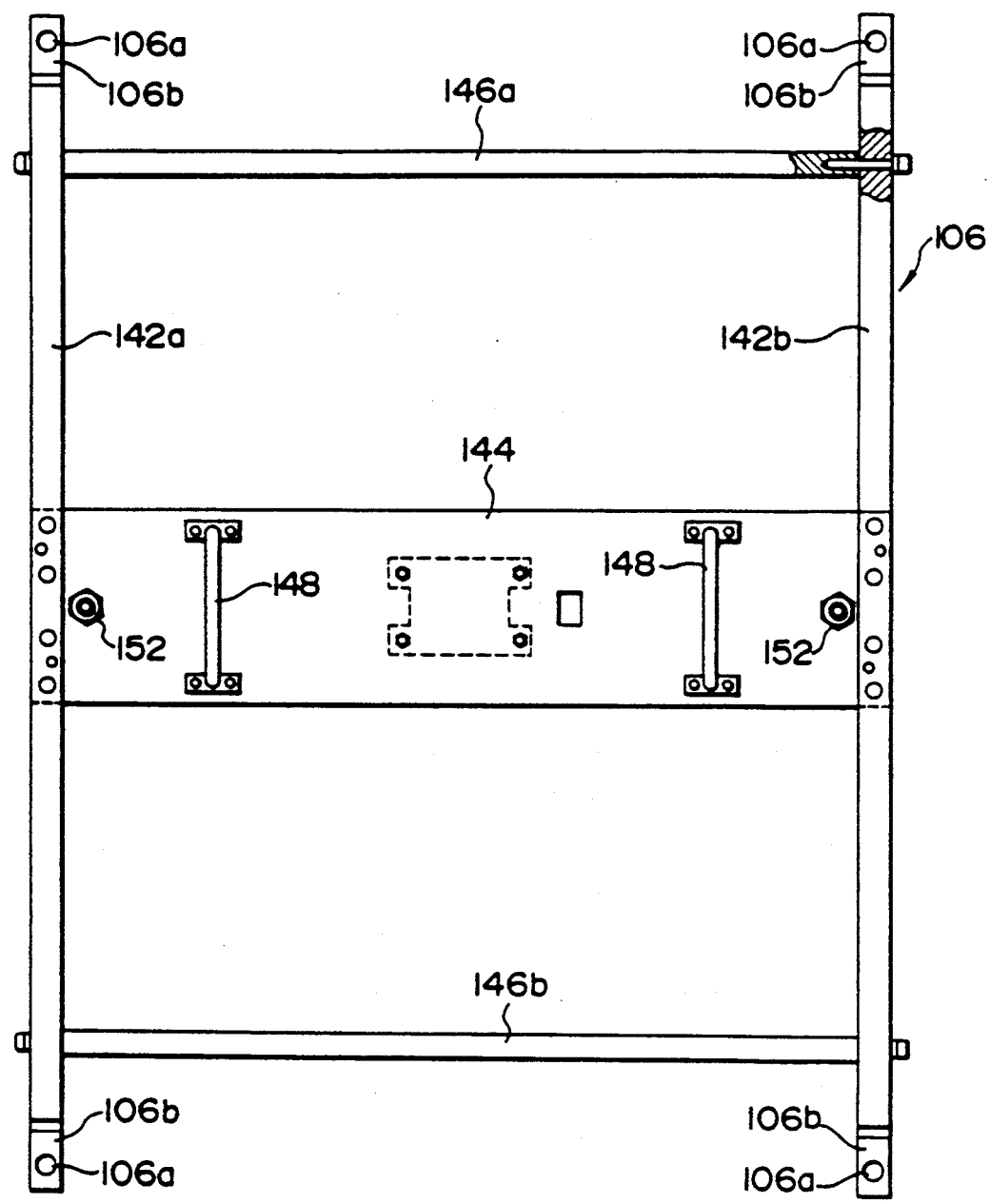
FIG. 15 is a front view showing an arrangement of a chuck master of a chuck mechanism.

The first mounting station 36a holds a chuck master 106 (to be described later and which is shown in FIGS. 8 and 15) of the chuck mechanism 34 at four corners. More specifically, the first mounting station 36a comprises a pair of mounting arms 108a and 108b which horizontally extend from the upper and lower ends of the rotary support member 94 to be parallel to each other. Holding mechanisms 110 (to be described later) are arranged on the two end portions of each of the mounting arms 108a and 108b. In other words, the four holding mechanisms 110 are disposed in correspondence with four corners of the chuck master 106.

The chuck master 106 has a size common to various chuck mechanisms 34. As a result, the holding positions at four corners of the chuck master 106, i.e., positions of the four holding mechanisms 110 are common to all the chuck mechanisms 34.

The holding mechanisms 110 are inserted in through holes 106a formed in four corner portions 106b of the chuck master 106, and grip the surrounding portions of the corresponding through holes 106a from two sides, thus detachably holding the corresponding corner portions 106b. The holding mechanisms 110 have the same arrangement.

Figure 14:
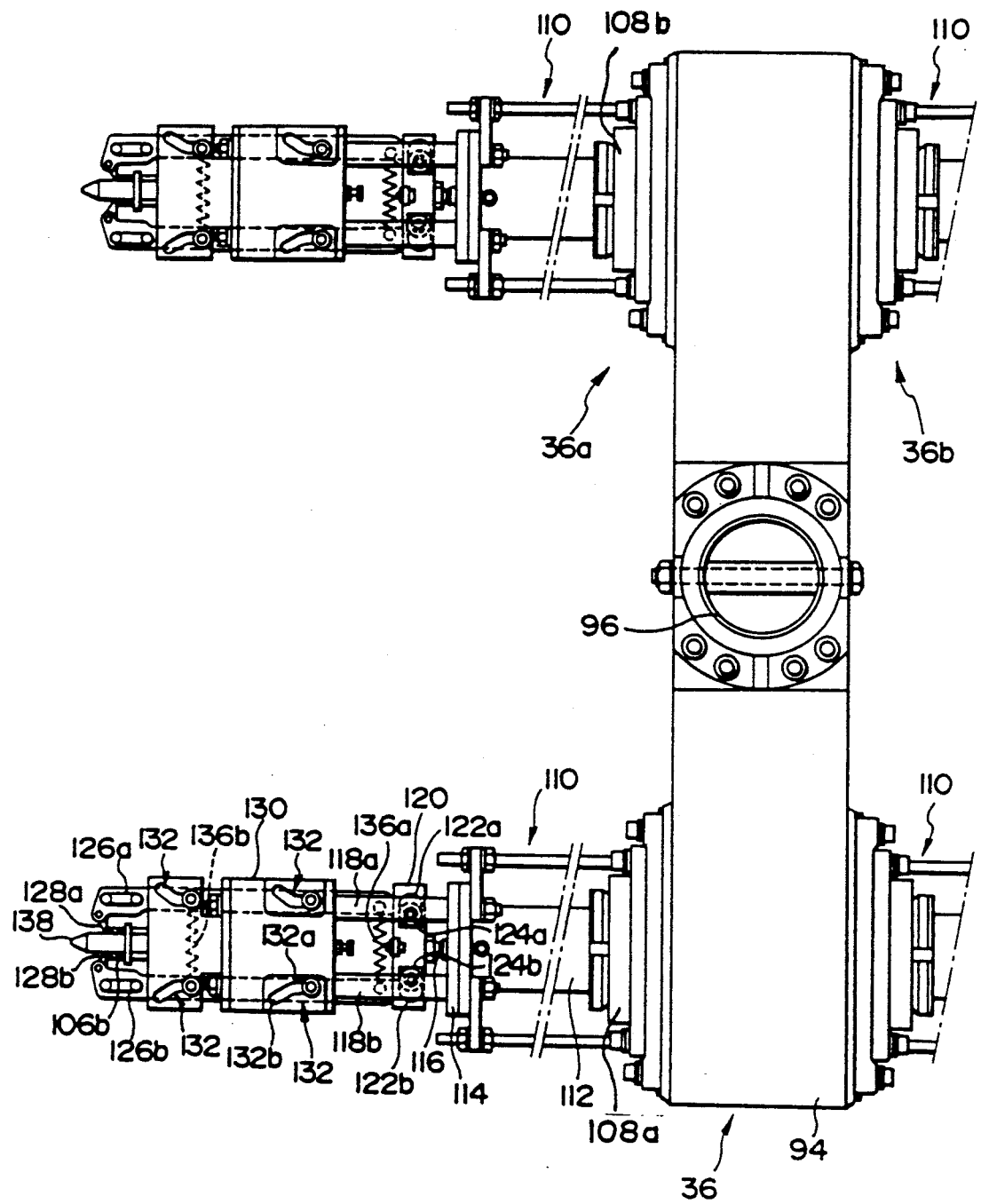
FIG. 14 is a top view showing an arrangement of a mounting station.

More specifically, as shown in FIG. 14, parallel air cylinders 112 are mounted on the end portions of the mounting arms 108a and 108b to horizontally project therefrom. A mounting plate 114 is fixed to the distal 118a and 118b are mounted on the mounting plate 114 to extend in the same direction as a moving direction of a piston rod 116 of the air cylinder 112.

A slide guide 120 is mounted on the distal end of the piston rod 116. The slide guide 120 is slidably supported by the pair of guide rods 118a and 118b to be slidable along their extending direction. Elongated holes 122a and 122b are formed in two end portions of the slide guide 120 to extend in directions perpendicular to the extending directions of the guide rods 118a and 118b. A pair of lock members 126a and 126b are provided while their proximal end portions are inserted in these elongated holes 122a and 122b through rollers 124a and 124b, respectively. The lock members 126a and 126b extend along the guide rods 118a and 118b until their distal end portions project from the guide rods 118a and 118b by a predetermined distance.

Lock pieces 128a and 128b which are inwardly bent at 90° are mounted on the distal ends of the lock members 126a and 126b, respectively. Opposite inner surfaces of these lock pieces 128a and 128b are inclined to open outwardly. Furthermore, the lock pieces 128a and 128b are elastically held in the 90° bent state, and are allowed to close further inwardly but are inhibited from opening outwardly. In this manner, each corner portion 106b of the chuck master 106 once locked inside these lock pieces 128a and 128b is held at this lock position. When the lock members 126a and 126b are displaced outwardly, this holding state is released.

A cam member 130 is attached to the distal ends of the guide rods 118a and 118b so as to displace the lock members 126a and 126b outwardly as they project while allowing a predetermined slide amount of the slide guide 120. A pair of series cam grooves 132, i.e., a total of four cam grooves 132 are formed in two sides of the cam member 130. Each cam groove 132 consists of a first cam groove portion 132ak extending along the projecting direction of the piston rod 116 and a second cam groove portion 132b which is formed contiguous with the distal end of the first cam groove portion 132a and is inclined obliquely outwardly.

Rollers 134 inserted in the corresponding cam grooves 132 are rotatably and axially supported on the lock members 126a and 126b located at two sides of the cam member 130. A pair of coil springs 136a and 136b extend between the lock members 126a and 126b to bias them inwardly. An insertion pin 138 to be inserted in the through hole 106a of the chuck master 106 projects from the distal end of the cam member 130.

The insertion pin 138 is long enough to extend through the corresponding through hole 106a while the corner portion 106b of the chuck master 106 is locked by the distal end portions of the lock members 126a and 126b The distal end of the insertion pin 138 is tapered to facilitate insertion into the through hole 106a.

Since each holding mechanism 110 is arranged as described above, the piston rod 116 is biased to be retracted inwardly when no compressed air is introduced into the air cylinder 112. As a result, the rollers 134 of the pair of lock members 126a and 126b coupled to the piston rod 116 through the mounting plate 114 abut against the proximal end edges of the first cam groove portions 132a of the corresponding cam grooves 132. The lock pieces 128a and 128b respectively attached to the distal ends of the lock members 126a and 126b are set in a state wherein they hold the corresponding corner portion 106b of the chuck master 106, in other words, in an opening inhibition state.

On the other hand, when compressed air is introduced into the air cylinder 112, the piston rod 116 is pushed out. As a result, the pair of lock members 126a and 126b coupled to the piston rod 116 through the mounting plate 114 are pushed forward while their rollers 134 pass the first cam groove portions 132a of the corresponding cam grooves 132. Thereafter, the lock members 126a and 126b are deviated outwardly along the inclination of the second cam groove portions 132b when their rollers 134 reach and pass the second cam groove portions 132b. As a result, the lock pieces 128a and 128b respectively attached to the distal ends of the lock members 126a and 126b are further separated from each other, and are set in a state wherein they are not engaged with the corresponding corner portion 106b of the chuck master 106, in other words, in an open state.

When the holding mechanisms 110 are in the holding state, if the lock mechanisms 90 of the up-and-down slide block 82 approach the chuck master 106, the insertion pins 138 of the corresponding holding mechanisms 110 are inserted in the through holes 106a formed in the corner portions 106b of the chuck master 106, thus attaining positioning. When the lock mechanisms 90 approach further, the corner portions 106b are engaged with the lock pieces 128a and 128b of the corresponding holding mechanisms 110. Upon engagement, the lock pieces 128a and 128b move inwardly, and each corner portion 106b passes beyond these lock pieces 128a and 128b and is locked inside them.

After the corner portion 106b passes beyond the lock pieces 128a and 128b while pushing them inwardly, these lock pieces 128a and 128b are recovered to 90° upright states from the lock members 126a and 126b by their own biasing forces. In this manner, the corner portions 106b of the chuck master 106 are held by the corresponding holding mechanisms 110. As a result, the chuck master 106 is reliably mounted on and held by the first mounting station 36a.

The arrangement of the chuck mechanism 34 for chucking the work W will be described below with reference to FIGS. 15 and 16.

As described above, the chuck mechanism 34 comprises a chuck member 140 (indicated by an alternate long and short dashed line in FIG. 8) formed in correspondence with one of the shapes of works W formed by various molds 16, and the chuck master 106 formed to have a shape and size common to all the chuck members 140, as shown in FIG. 15.

The chuck master 106 comprises a pair of parallel mounting arms 142ak and 142b extending in the up-and-down direction to be separated at a predetermined distance, a main plate 144 extending in a lateral direction to couple the central portions of these mounting arms 142a and 142b, and a pair of cross members 146a kand 146b extending in a lateral direction to couple and reinforce upper and lower end portions of the mounting arms 142a and 142b, respectively.

The four corner portions 106b of the chuck master 106 are defined from the end portions of the mounting arms 142a and 142b. More specifically, the above-mentioned through holes 106a are respectively formed in the end portions (corner portions) of the mounting arms 142a and 142b.

A pair of handle members 148 to which all the types of chuck members 140 formed in correspondence with the shapes of the works W formed by the various molds 16 can be attached are mounted on the right and left side portions of the front surface (surface facing up in the illustrated state) of the main plate 144. As shown in FIG. 16, lock pins 150 to be detachably locked with the up-and-down slide block 82 of the three-dimensional slide drive mechanism 70 are fixed to the right and left end portions of the rear surface of the main plate 144 through nuts 152.

Figure 16:
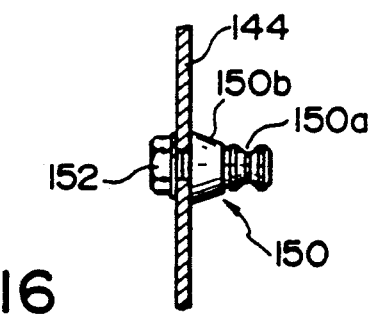
FIG. 16 is a side sectional view showing an arrangement of a lock pin fixed to the chuck master.

As shown in FIG. 16, each lock pin 150 comprises a head portion 150a, an intermediate portion of which is constricted, and a skirt portion 150b formed integrally with the head portion 150a and tapered wider toward the proximal end portion.

In this manner, the chuck mechanism 34 exclusively formed for the corresponding mold 16 is constituted by the chuck member 140 attached through the handle members 148, the chuck master 106, and the lock pins 150.

The arrangement of each lock mechanism 90 for detachably locking the up-and-down slide block 82 and the chuck mechanism 34 will be described in detail below with reference to FIG. 17.

Figure 17:
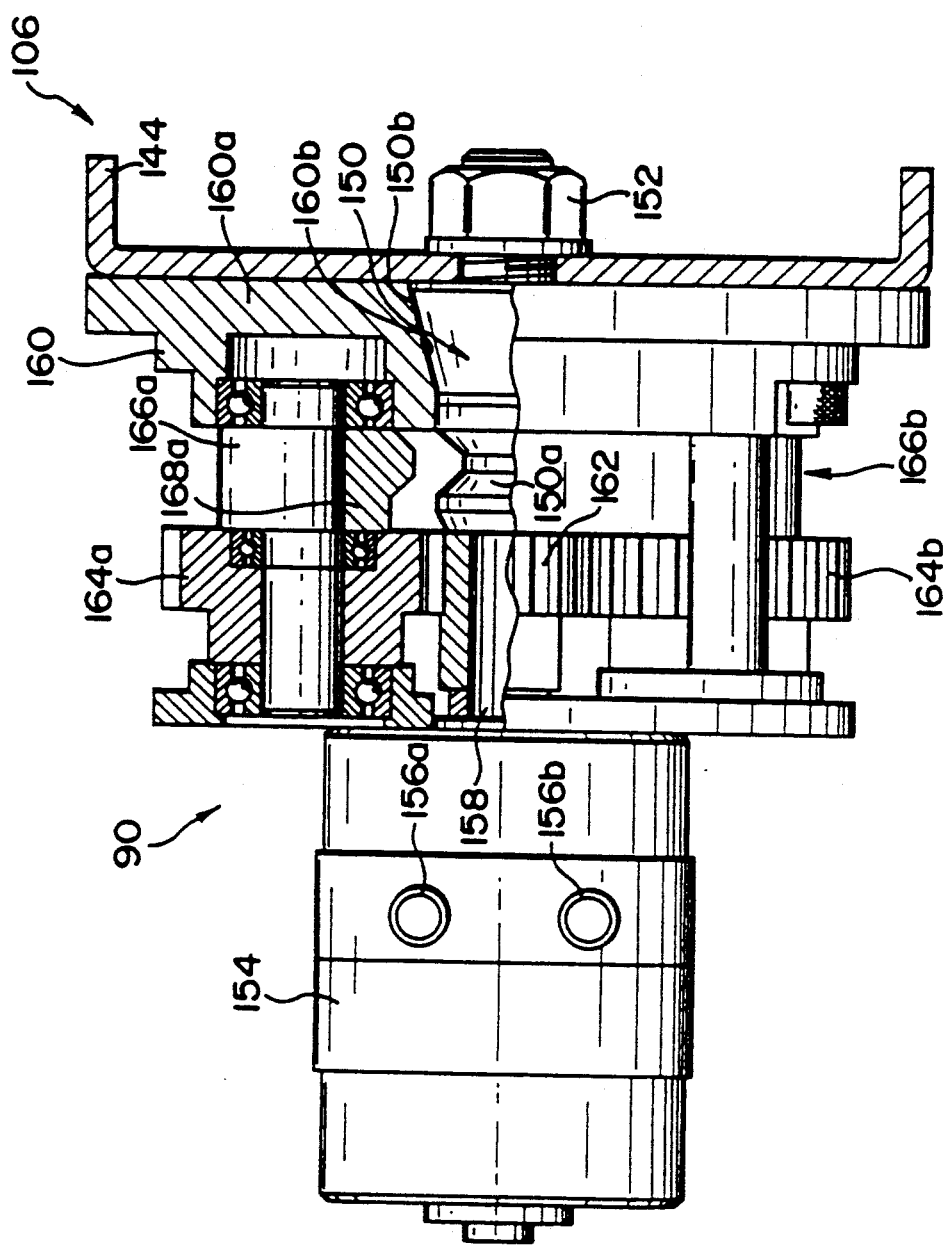
FIG. 17 is a side sectional view showing an arrangement of a lock mechanism.

As shown in FIG. 17, each lock mechanism 90 comprises air motors 154 respectively attached to portions of the up-and-down slide block 82 opposing the pair of lock pins 150 of the chuck mechanism 34. Each air motor 154 comprises input ports 156a and 156b to which compressed air is introduced. A rotating shaft 158 of the air motor 154 is rotated, so that its rotating direction is determined by compressed air introduced into the input port 156a or 156b.

A hollow attachment housing 160 is fixed to the distal end face of the air motor 154 while the distal end of the driving shaft 158 projects therein. An insertion hole 160b allowing insertion of the lock pin 150 is formed in the front portion of the attachment housing 160, i.e., a portion 160a opposing the lock pin 150. The diameter of the insertion hole 160b is set to be almost equal to the width of the skirt portion 150b of the lock pin 150, and the inner peripheral surface of the insertion hole 160b is tapered to complementarily match with the tapered surface of the skirt portion 150b.

In a state wherein the lock pin 150 is inserted in the insertion hole 160b so that its skirt portion 150b is in contact with the inner peripheral surface of the insertion hole 160b, the head portion 150a of the lock pin 150 is located inside the attachment housing 160, as shown in FIG. 17. In other words, a space which is large enough to receive the head portion 150a of the lock pin 150 is defined between the inner surface (rear surface) of the front portion 160a of the attachment housing 160 and the front surface of a driving gear 162.

In the attachment housing 160, the driving gear 162 is coaxially fixed to the distal end of the driving shaft 158. A pair of upper and lower driven gears 164a and 164b meshed with the driving gear 162 are rotatably and axially supported on the attachment housing 160 to have drive axes parallel to that of the driving gear 162.

Cam rollers 166a and 166b eccentrical from the rotating axis of the driven gears 164a and 164b are coupled to the distal end portions of the driven gears 164a and 164b to be rotated together. A first fitting member 168a having a lower surface surface complementarily fitted in an upper portion of the head portion 150a of the lock pin 150 inserted in the attachment housing 160 is in rolling contact with the lower portion of the outer peripheral surface of the upper cam roller 166a. Furthermore, a second fitting member (not shown) having an upper surface shape complementarily fitted in a lower portion of the head portion 150a of the lock pin 150 inserted in the attachment housing 160 is in rolling contact with the upper portion of the outer peripheral surface of the lower cam roller 166b.

These first and second fitting members 168a and 168b are normally biased by coil springs (not shown) to be urged against the outer peripheral surfaces of the corresponding cam rollers 166a and 166b.

FIG. 17 shows an unlocked state of the lock mechanism 90. This unlocked state is defined as follows. That is, as shown in FIG. 17, outer peripheral surface portions of the pair of cam rollers 166a and 166b, which are closest to the rotating axes of the corresponding driven gears 164a and 164b, are in rolling contact with the corresponding fitting members 168a and 168b. As a result, the fitting members 168a and 168b are displaced to positions separated sideward from the head portion 150a of the inserted lock pin 150.

Although not shown, in a locked state, the outer peripheral surface portions of the pair of cam rollers 166a and 166b, which are farthest from the rotating axes of the corresponding driven gears 164a and 164b, are in rolling contact with the corresponding fitting members 168a and 168b. As a result, the fitting members 168a and 168b are displaced to positions where they are fitted in the head portion 150a of the inserted lock pin 150 from its two sides.

In the lock mechanism 90 with the above arrangement, the lock operation will be described below. In the unlocked state shown in FIG. 17, the up-and-down slide block 82 is moved along the lateral direction, and the lock pins 150 of the chuck mechanism 34 attached to the second mounting station 36b are relatively inserted in the insertion holes 160b of the lock mechanism 90. The tapered surface of the skirt portion 150b of each lock pin 150 is brought into contact with the tapered surface constituting the inner peripheral surface of the insertion hole 160b to inhibit further lateral movement of the up-and-down slide block 82, thus stopping the movement.

When the slide block 82 stops, compressed air is introduced into each air motor 154 through one input port 156a, thus rotating the rotating shaft 158. Upon rotation of the rotating shaft 158, the driving gear 162 and the pair of driven gears 164a and 164b meshed with the driving gear 162 are pivoted. As a result, the cam rollers 166a and 166b are pivoted.

In this manner, the outer peripheral surface portions of the cam rollers 166a and 166b which are in rolling contact with the fitting members 168a and 168b are shifted from the closest portions to the farthest portions described above. Therefore, the fitting members 168ak and 168b are displaced from unlock positions where they are not fitted in the head portion 150a of the inserted lock pin 150 to lock positions where they are fitted in the head portion 150a. As a result, the lock pin 150 is locked by the lock mechanism 90. In other words, the chuck mechanism 34 is integrally connected to the up-and-down slide block 82 through the lock mechanisms 90.

When the locked state of the lock mechanism 90 is released, i.e., the mechanism 90 is unlocked, and the chuck mechanism 34 is detached from the up-and-down slide block 82, the operation is executed in a manner opposite to that described above. That is, compressed air is introduced into each air motor 154 through the other input port 156b, and the rotating shaft 158 is rotated in the reverse direction. Upon rotation of the rotating shaft 158 in the reverse direction, the cam rollers 166a and 166b are pivoted in the reverse direction.

In this manner, the outer peripheral surface portions of the cam rollers 166a and 166b which are in rolling contact with the fitting members 168a and 168b are shifted from the farthest portions to the closest portions described above. Therefore, the fitting members 168a and 168b are displaced from the lock positions where they are fitted in the head portion 150a of the inserted lock pin 150 to the unlock positions where they are separated from the head portion 150a. As a result, the lock pin 150 is unlocked from the lock mechanism 90. In other words, the chuck mechanism 34 is released from a state wherein it is integrally connected to the up-and-down slide block 82.

The exchanging operation of the chuck mechanism 34 at the pickup device 28 with the above arrangement will be described below.

More specifically, when the molding operation of the work W using the mold 16 which is loaded in one injection molding unit 12 and undergoes the injection-molding operation is completed, this mold 16 is exchanged, and a new mold 16' is loaded in the injection molding unit 12, as described above. In this case, the chuck mechanism 34 for chucking the work W to remove it from the new mold 16' is also exchanged at the same time.

A new chuck mechanism 34' corresponding to the new mold 16' to be loaded is attached to the first mounting station 36a in the replacing mechanism 36. On the other hand, nothing is attached to the second mounting station 36b to receive the chuck mechanism 34 which is being used and will be detached in the exchanging operation. Furthermore, the empty second mounting station 36b is pivoted to and held at a position opposing the up-and-down slide block 82.

In this standby state, when the exchanging operation of the mold 16 is started, the exchanging operation of the chuck mechanism 34 is started in response to this start instruction.

More specifically, in the exchanging operation of the chuck mechanism 34, the up-and-down slide block 82 is moved to a position opposing the replacing mechanism 36, and then begins to approach the second mounting station 36b in accordance with lateral slide movement of the right-and-left slide block 76.

The four corner portions 106b of the chuck master 106 of the chuck mechanism 34 integrally connected to the up-and-down slide block 82 through the pair of lock mechanisms 90 are held by the four holding mechanisms 110 provided to the second mounting station 36b. Thereafter, the two lock mechanisms 90 transit from the locked state to the unlocked state, and the lock pins 150 locked by the chuck master 106 are released from the locked state of the lock mechanisms 90 and are set in a free state.

Thereafter, the right-and-left slide block 76 is slid in the reverse direction, and the up-and-down slide block 82 is separated from the second mounting station 36b. As described above, the lock mechanisms 90 are set in the unlocked state, and the chuck mechanism 34 is held by the second mounting station 36b through the four holding mechanisms 110. Therefore, as the up-and-down slide block 82 is separated, and the chuck mechanism 34 is detached from the up-and-down slide block 82 and is independently held by the second mounting station 36b.

In the replacing mechanism 36, the air cylinder 100 is energized to pivot the rotary support member 94 through 180°. Upon this pivotal movement, the second mounting station 36b on which the chuck mechanism 34 detached from the up-and-down slide block 82 is attached is moved to an opposite side, and the first mounting station 36a on which a new chuck mechanism 34' to be attached to the up-and-down slide block 82 is attached is moved to a position opposing the up-and-down slide block 82 which is temporarily separated sideward from the replacing mechanism 36.

Thereafter, the up-and-down slide block 82 approaches the replacing mechanism 36, so that the lock pins 150 of the new chuck mechanism 34' are inserted in the pair of lock mechanisms 90 in the unlocked state. The lock mechanisms 90 transit from the unlocked state to the locked state, so that these clock pins 150 are locked by the corresponding lock mechanisms 90.

Upon the lock operation of the lock mechanisms 90, the four holding mechanisms 110 at the first mounting station 36a are set in a state for releasing the holding state of the new chuck mechanism 34'. As a result, when the up-and-down slide block 82 is slid to be separated from the replacing mechanism 36, the new chuck mechanism 34' is detached from the first mounting station 36', and is attached to the up-and-down slide block 82 through the lock mechanisms 90 to be integrally connected thereto. In this manner, the replacing operation of the chuck mechanism 34 is completed.

At the second mounting station 36b which is moved to an outer position, the exchanged chuck mechanism 34 is detached therefrom, and a chuck mechanism 34 to be mounted next is attached. At this time, the second mounting station serves as the first mounting station, and the first mounting station 36a which transfers the new chuck mechanism 34' to the up-and-down slide block 82 serves as the second mounting station in turn.

As many apparently widely different embodiments of the present invention can be made without departing from the spirit and scope thereof, it is to be understood that the invention is not limited to the specific embodiments thereof except as defined in the appended claims.

What is claimed is:

1. An injection molding apparatus which comprises: first and second injection molding units, which are juxtaposed, for independently executing injection molding,
a placing station which is disposed between said first and second injection molding units, and to which a used injection-molding metal mold detached from each of said first and second injection molding units is conveyed to be commonly placed thereon; and
work pickup means, arranged on a top portion of each of said first and second injection molding units, for picking up a work formed by a corresponding metal mold, said work pickup means including chuck means for chucking the work, a slide block for detachably holding said chuck means, and drive means for three-dimensionally moving said slide block; and
exchanging means for automatically exchanging said chuck means of said work pickup means in accordance with a shape of the work.

2. The apparatus according to claim 1, wherein said exchanging means includes:
a first replacing station for holding said chuck means, said chuck means being detachable from said work pickup means to be exchanged; and
a second replacing station for holding next chuck means, said next chuck means to be attached to said work pickup means from which said chuck means has been detached.

3. The apparatus according to claim 2, wherein said exchanging means further includes:
a frame body which is supported to be rotatable about a vertical axis, said first replacing station being located on a first side of said frame body and said second replacing station being located on a second side of said frame body, said first replacing station being separated from said second replacing station by a 180° angular interval; and
rotary driving means for rotating said frame body by 180°.

4. The apparatus according to claim 1, wherein said work pickup means further includes lock means for fixing said chuck means to said slide block.

5. The apparatus according to claim 1, wherein said chuck means includes:
a chuck master common to various works; and
a chuck member which is detachably attached to said chuck master, said chuck member formed to correspond to each of the various works, and to satisfactorily grip a corresponding work.

6. The apparatus according to claim 5, wherein said exchanging means includes:
a first replacing station for holding said chuck means, said chuck means being detachable from said work pickup means to be exchanged using the chuck master thereof; and
a second replacing station for holding next chuck means, said next chuck means to be attached to said work pickup means from which said chuck means has been detached.

7. The apparatus according to claim 6, wherein each of said first and second replacing stations includes holding means for detachably holding corresponding chuck master at four corners thereof.

8. An injection molding apparatus which comprises; first and second injection molding units, which are juxtaposed, for independently executing injection molding,
a placing station which is disposed between said first and second injection molding units, and to which a used injection-molding metal mold detached from each of said first and second injection molding units is conveyed to be commonly placed thereon; and
wherein said first and second injection molding units are disposed to be separated from each other to have a space necessary for installing said placing station therebetween; and
first and second standby stations which are disposed adjacent to outer sides of said first and second injection molding units respectively, and in which molds to be used next in a corresponding injection molding unit are set; and wherein said first and second standby stations are disposed at positions adjacent to mold loading ports of the first and second injection molding units; and
said placing station is disposed at a position to be adjacent to mold unloading ports of said first and second injection molding units at two sides; and
a first conveyor for conveying a metal mold from said first standby station to said placing station through said first injection molding unit; and
a second conveyor for conveying a metal mold from said second standby station to said placing station through said second injection molding unit; and
wherein said first and second conveyors comprise convey paths which are aligned in line.

* * * * *

UNITED STATES PATENT AND TRADEMARK OFFICE
CERTIFICATE OF CORRECTION

PATENT NO. : 5,061,169

DATED : October 29, 1991

INVENTOR(S) : Shinji Yamashiro et al.

It is certified that error appears in the above-identified patent and that said Letters Patent is hereby corrected as shown below:

Col. 7, line 39:
after "mold" insert --.--;

Col. 9, line 34:
after "distal" insert --end of each air cylinder 112, and a pair of guide rods--;

Col. 10, line 3:
"132ak" should be --132a--;

Col. 10, line 20:
after "126b" insert --.--;

Col. 11, line 17:
"142ak" should be --142a--;

Col. 11, line 21:
"146a kand" should be --146a and--;

Col. 13, line 18:
"168ak" should be --168a--.

Signed and Sealed this

Fifteenth Day of June, 1993

Attest:

MICHAEL K. KIRK

Attesting Officer

Acting Commissioner of Patents and Trademarks